(No Model.)

T. & A. TURNBULL.
THISTLE PULLER.

No. 243,817. Patented July 5, 1881.

WITNESSES:
C. Neveux
C. Sedgwick

INVENTOR:
T. Turnbull
A. Turnbull
BY
Munn & Co
ATTORNEYS.

UNITED STATES PATENT OFFICE.

THOMAS TURNBULL AND ALEXANDER TURNBULL, OF CAMILLA, ONTARIO, CANADA.

THISTLE-PULLER.

SPECIFICATION forming part of Letters Patent No. 243,817, dated July 5, 1881.

Application filed November 10, 1880. (No model.)

*To all whom it may concern:*

Be it known that we, THOMAS TURNBULL and ALEXANDER TURNBULL, of Camilla, Province of Ontario and Dominion of Canada, have invented a new and useful Improvement in Thistle-Pullers, of which the following is a specification.

Figure 1:
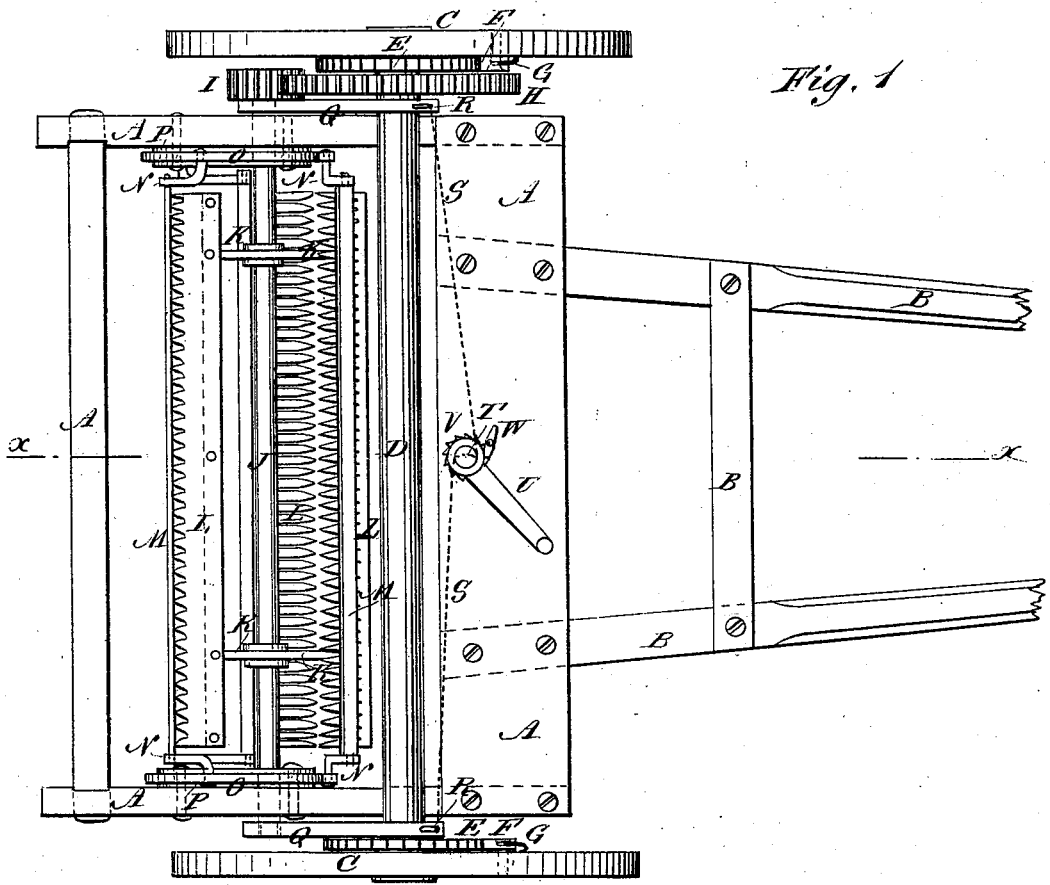
Figure 2:
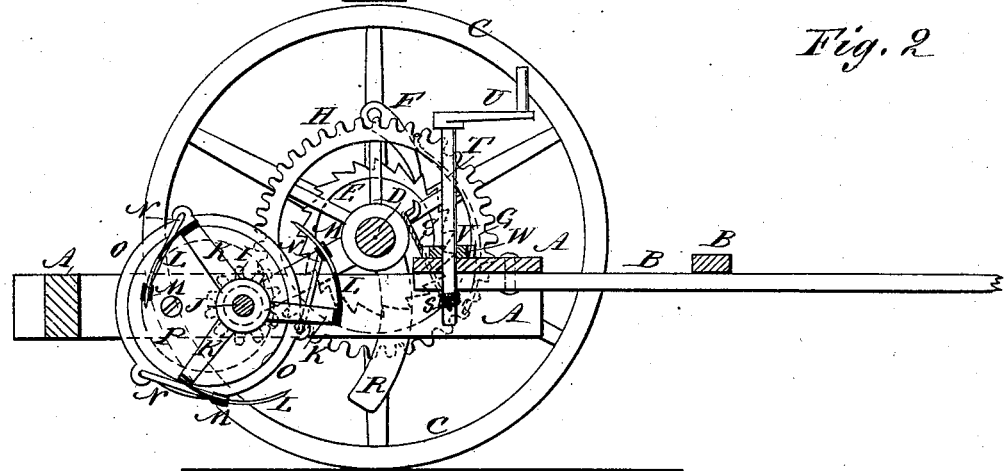

Figure 1 is a plan view of the improvement. Fig. 2 is a sectional side elevation taken through the line *x x*, Fig. 1.

Similar letters of reference indicate corresponding parts.

The object of this invention is to furnish thistle-pullers so constructed as to pull up by the roots or break off close to the ground thistles and other large weeds growing in grain without injuring the grain, and which shall be simple in construction and convenient in use.

A is a frame, to the forward part of which are attached shafts B, so that the movement of the machine can be controlled by the horse.

C are the wheels, which are made to carry their axle D with them in their revolution by the ratchet-wheels E, attached to the axle D, and the pawls F, pivoted to the wheels C, and held to their work by springs G, also attached to the wheels C. With this construction the machine can be turned and backed without any danger of breaking the mechanism.

To the axle D, at the side of the frame A, is attached a large gear-wheel, H, the teeth of which mesh into the teeth of a small gear-wheel, I, attached to the end of a shaft, J, so that the said shaft will be revolved by the forward movement of the machine.

To the shaft J, or to hubs attached to the said shaft, are attached two or more sets of three, more or less, radial arms, K, but preferably three. The radial arms K are arranged with their corresponding arms parallel with each other, and to the outer ends of the said corresponding arms are attached toothed bars L, which are curved laterally upon the arc of a circle having its center in the axis of the shaft J.

The teeth may be formed in one piece with the bars, or they may be formed separate and attached to the bars, as may be desired.

The spaces between the teeth of the toothed bars L are made wider at the forward ends of the said teeth and become gradually narrower toward the rear ends of the teeth, so that the blades of grain can pass in farther than the coarser and stiffer thistles and weeds, and can be readily drawn out, while the said thistles cannot.

Upon the toothed bars L are placed slotted bars M, which may be formed in one piece or of two bars secured to each other at the ends.

To the ends of the slotted bars M are pivoted the ends of cranks N, the other ends of which are pivoted to ring-plates O. The ring-plates O are placed in ring-grooves in the faces of stationary wheels P, placed eccentrically upon the shaft J and securely attached to the side bars of the frame A. With this construction, as the toothed bars L are carried around by the revolution of the shaft J they will carry the slotted bars M with them, and the said slotted bars M will carry the ring-plates O around upon the eccentrics P. The eccentrics P are so arranged that they will cause the ring-plates O to draw the slotted bars M back upon the toothed bars L as the said toothed bars are passing forward and upward beneath the shaft J, so as to uncover the teeth and allow the thistles and other weeds and the blades of grain to pass into the spaces between the teeth of the toothed bars L. As the toothed bars L rise upon the forward side of the shaft J the blades of the grain, being thin, draw out of the spaces between the teeth of the toothed bars L; but the stalks of the thistles and other weeds, being thicker and harder, wedge themselves into said spaces, so that they are either drawn up by the roots or are broken off close to the ground. As the toothed bars L pass rearward and downward above the shaft J the eccentrics P cause the ring-plates O to push the slotted bars M forward upon the toothed bars L, pushing the thistles and other weeds out of the spaces between the teeth of the said bars, and causing them to drop to the ground in the rear of the machine, so that the thistles and weeds will be destroyed without injuring the growing grain.

Q are connecting-bars, which have holes in their rear ends to receive and ride upon the end parts of the shaft J, and holes in their forward ends to receive and ride upon the end parts of the axle D, so that the wheels and axle C D will be pushed forward by the frame A.

To the forward ends of the connecting-bars Q are attached the upper ends of curved arms R, which pass down at the outer sides of the side bars of the frame A, so as to keep the said frame A and the wheels and axle C D in proper position laterally. To the forward ends of the connecting-bars Q are attached the ends of small chains or cords S, which pass through guide-holes or eyes formed in or around guide-pulleys pivoted to the side parts of the frame A, and are attached to the lower end of a vertical shaft, T.

The vertical shaft T is swiveled to the middle forward part of the frame A, and has a hand wheel or crank, U, attached to its upper end, for convenience in operating it.

To the shaft T, just above the bar or platform of the frame A, is attached a ratchet-wheel, V, with the teeth of which engages a pawl, W, pivoted to the frame A.

With this construction, the frame A and its attachments can be raised toward or lowered from the axle D to adjust the toothed bars L to work at any desired distance from the ground, or to raise them away from the ground for convenience in passing from place to place.

Having thus described our invention, we claim as new and desire to secure by Letters Patent—

1. In a thistle-puller, the combination, with the axle on wheels and the frame A B, of the gear-wheels H I, shaft J, having radial arms K, the toothed bars L, the slotted bars M, the crank-arms N, the ring-plates O, and the stationary eccentrics P, as and for the purpose specified.

2. In a thistle-puller, the combination, with the frame A, the shaft J, having radial arms K, and the toothed bars L, of the slotted bars M, the crank-arms N, the ring-plates O, and the stationary eccentrics P, substantially as herein shown and described, whereby the toothed bars are cleared of thistles and weeds automatically as the machine advances, as set forth.

THOMAS TURNBULL.
ALEXANDER TURNBULL.

Witnesses:
M. WILKINS,
A. A. HUGHSON.